Patented Oct. 3, 1933

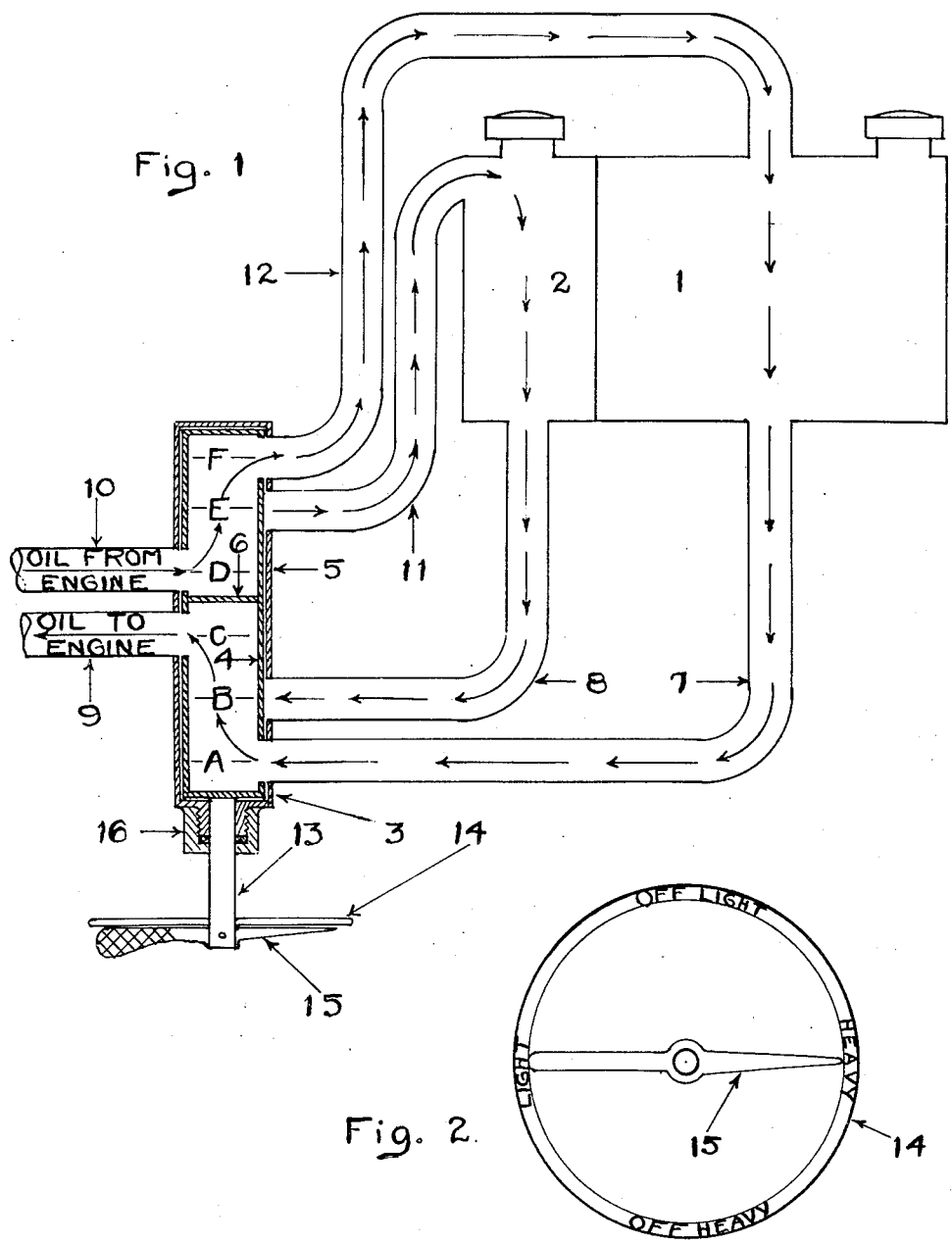

1,929,242

UNITED STATES PATENT OFFICE 1,929,242

LUBRICATION SYSTEM FOR HEAT GENERATING POWER PLANTS

Edmund P. Gaines, Columbia, S. C.

Application March 18, 1929. Serial No. 347,812

3 Claims. (Cl. 184—6)

My invention relates to lubricating systems for a circuit of machine parts and is especially adapted to the cold weather operation of internal combustion engines. In an internal combustion engine, for instance, it is desirable to have a coating of thin oil on the working parts to facilitate starting in cold weather, but after the temperature rises to that normal for operation, a heavier bodied or more viscous oil is better for proper lubrication at high temperatures.

The object of this invention is to provide means whereby the bearing surfaces of an engine may be supplied with one grade of lubricant to facilitate starting and to provide proper low temperature lubrication, and with another grade lubricant for correct high temperature lubrication.

A further object is to utilize the heat of the engine, transmitted thru the medium of the thin oil, to raise the temperature of the heavy oil.

Fig. 1 is a diagrammatic view of the system, and
Fig. 2 is a face view of the control cock dial.

The construction of the system is as follows: The tank, Fig. 1, is constructed in two sections, or the equivalent. The small compartment 2 is for light oil and the large compartment or tank 1 is for heavy oil. The valve 3, is composed of two inter-fitting pieces of tubing or its equivalent; inner tube 4 rotating in outer tube 5. Inner tube 4 contains a solid partition 6 and is sealed at both ends, while outer tube 5 is sealed at one end only tho it is closed at the opposite end, except for a valve stem passing thru a packing nut 16. Pipe 7 for heavy oil leads from tank 1 to valve 3 and pipe 8 for light oil leads from tank 2 to valve 3. Return pipes 11 and 12 lead from valve 3 to tanks 2 and 1 respectively. Pipes 9 and 10 connect valve 3 to the engine. A four-way cock, Fig. 2, operates the valve 3.

Considering zero degrees of rotation of inner tube 4 to be at the point marked "heavy" on dial 14, holes of a diameter substantially equal to the inside diameters of the pipes they serve are drilled thru one wall of the inner tube 4. At circumference "A" one hole is drilled at zero degrees. At circumference "B" one hole is drilled at 180°. At circumferences "C" and "D" holes are drilled at zero degrees, 90°, 180°, and 270°. At circumference "E" holes are drilled at 180° and 270°. At circumference "F" holes are drilled at zero degrees and 90°.

The operation of the invention is as follows: Consider engine running and cock 15, Fig. 2, set at "Heavy" on the dial 14. Holes in inner tube 4 on circumferences "A", "C", "D", and "F" coincide respectively with pipes 7, 9, 10, and 12, making a complete oil circuit for heavy oil. Just before the engine is stopped, cock 15 is rotated clockwise 90° to "Off heavy". Pipe 7 is closed but pipes 9, 10, and 12, remain open and the engine is scavenged of heavy oil. Just as the oil gauge needle begins to "flicker", cock 15 is rotated another 90° clockwise to "Light". Holes in inner tube 4 now coincide with pipes 8, 9, 10, and 11, completing the circuit for light oil. The engine is stopped after the oil pump has filled it with light oil. At any subsequent time the engine will start easily regardless of its temperature due to being lubricated with thin oil.

To start the engine, leave cock 15 on position "Light", dial 14, and start in usual manner. When engine has warmed up and light oil in compartment 2 has, thru an interchange of heat, warmed heavy oil in compartment 1 sufficiently, rotate cock 15 90° clockwise to "Off light". Now holes in inner tube 4 coincide with pipes 9, 10, and 11 and engine is scavenged of light oil. As before, when the oil gauge begins to "flicker" switch cock 15 clockwise to "Heavy", throwing heavy oil circuit into operation.

The expression "grade of oil" as used herein as well as in the claims is intended to define an oil or lubricant of a given quality and of a given viscosity under the same temperature conditions. A different "grade of oil" therefore is an oil or lubricant which under the same temperature conditions is of a different quality and of a different viscosity, which latter characteristic may, as in any grade of oil, vary as its temperature is raised or lowered.

While the forms of construction and means of operation herein described and shown constitute the preferred form or embodiment of this invention, it is to be understood that other forms may be adopted, all coming within the scope of the claims which follow.

What I claim is:

1. In a lubricating system for a circuit of machine parts, an oil feed passage, an oil exit passage, both said passages being connected with said circuit, an oil tank, a unitary valve connected with said passages, inlet and outlet connections from said tank to said valve, said valve having a position of adjustment for connecting said feed passage with said outlet connection and for simultaneously connecting said exit passage with said inlet connection, and said valve having another position of adjustment for connecting said exit passage with said inlet connection.

2. In a lubricating system for a circuit of machine parts having an oil feed passage and an oil exit passage, an oil tank having a plurality of compartments, inlet and outlet connections for each said compartment, and a unitary valve for selectively connecting the inlet and outlet connections of any one compartment with said exit and feed passages, respectively, said valve having a second selective position for each compartment, for connecting said exit passage only with each said compartment.

3. In a lubricating system for a circuit of machine parts having an oil feed passage and an oil exit passage, a plurality of oil tanks, inlet and outlet connections for each said tank, valve means for selectively connecting the inlet and outlet connections of any one said tank with said exit and feed passages respectively, said valve means having a second selective position for each said tank for connecting only said exit passage therewith.

EDMUND P. GAINES.